(12) United States Patent
Peterson

(10) Patent No.: US 6,789,434 B2
(45) Date of Patent: Sep. 14, 2004

(54) FLUID FLOWMETER HAVING A HALL EFFECT SENSOR WITH AN INTERNAL MAGNET

(75) Inventor: James W. Peterson, Elkhart, IN (US)

(73) Assignee: Dwyer Instruments, Inc., Michigan City, IN (US)

(*) Notice: Subject to any disclaimer, the term of this patent is extended or adjusted under 35 U.S.C. 154(b) by 15 days.

(21) Appl. No.: 10/202,216

(22) Filed: Jul. 24, 2002

(65) Prior Publication Data

US 2003/0074984 A1 Apr. 24, 2003

Related U.S. Application Data

(60) Provisional application No. 60/347,652, filed on Oct. 23, 2001.

(51) Int. Cl.[7] .................................................. G01F 1/74
(52) U.S. Cl. .................................................. 73/861.77
(58) Field of Search ........................ 73/861.77, 861.78, 73/861.79, 861.91, 861.88

(56) References Cited

U.S. PATENT DOCUMENTS

| 4,275,291 A | * | 6/1981 | Feller ........................ 377/21 |
| 4,337,655 A | * | 7/1982 | Sundstrom et al. ...... 73/861.03 |
| 4,825,707 A | * | 5/1989 | Rosaen .................... 73/861.77 |
| 5,433,118 A |   | 7/1995 | Castillo |
| 5,877,429 A | * | 3/1999 | Gauley et al. ........... 73/861.77 |
| 5,932,814 A | * | 8/1999 | Hutchinson .............. 73/861.75 |
| 6,012,339 A | * | 1/2000 | Genack et al. ........... 73/861.77 |
| 6,257,073 B1 | * | 7/2001 | Lee et al. ................ 73/861.91 |

FOREIGN PATENT DOCUMENTS

| GB | 2242528 | 10/1991 |
| WO | WO 98/41819 | 9/1998 |

\* cited by examiner

*Primary Examiner*—Edward Lefkowitz
*Assistant Examiner*—Jewel V. Thompson
(74) *Attorney, Agent, or Firm*—Barnes & Thornburg

(57) ABSTRACT

A flowmeter for sensing fluid flow. The flowmeter includes a housing including a first port, a second port, a chamber in fluid communication with the first port and the second port, and a fluid passageway extending from the first port to the second port. An impeller having a non-magnetized metal pole piece is located within the chamber of the housing and is rotatable about an axis in response to fluid flow through the fluid passageway. A Hall Effect sensor and a magnet are located outside of the fluid passageway. The magnetic field generated by the magnet enables the Hall Effect sensor to sense rotation of the impeller and thereby the rate of fluid flow through the fluid passageway.

15 Claims, 3 Drawing Sheets

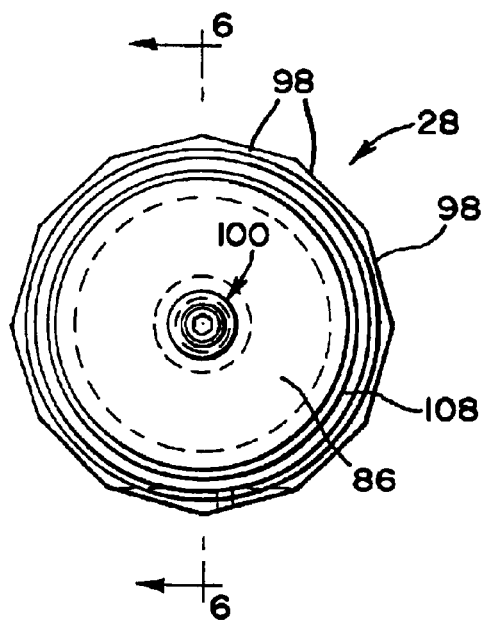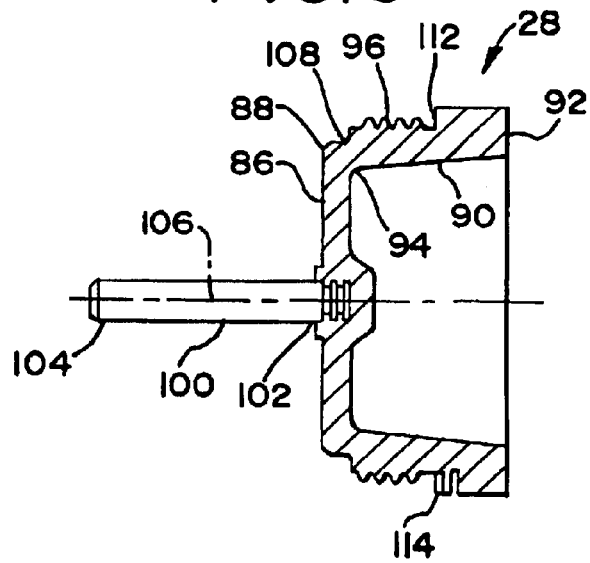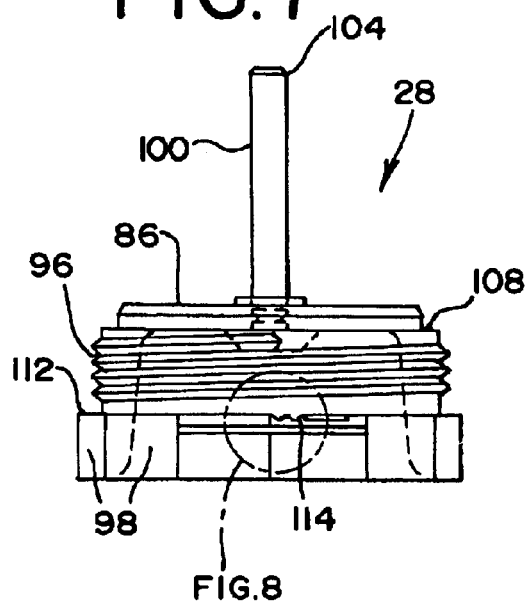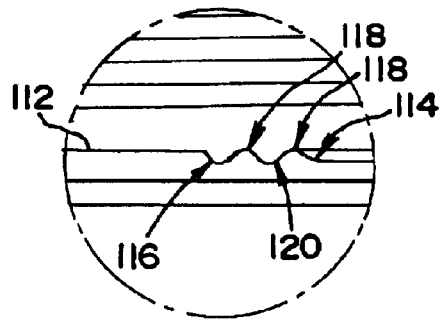

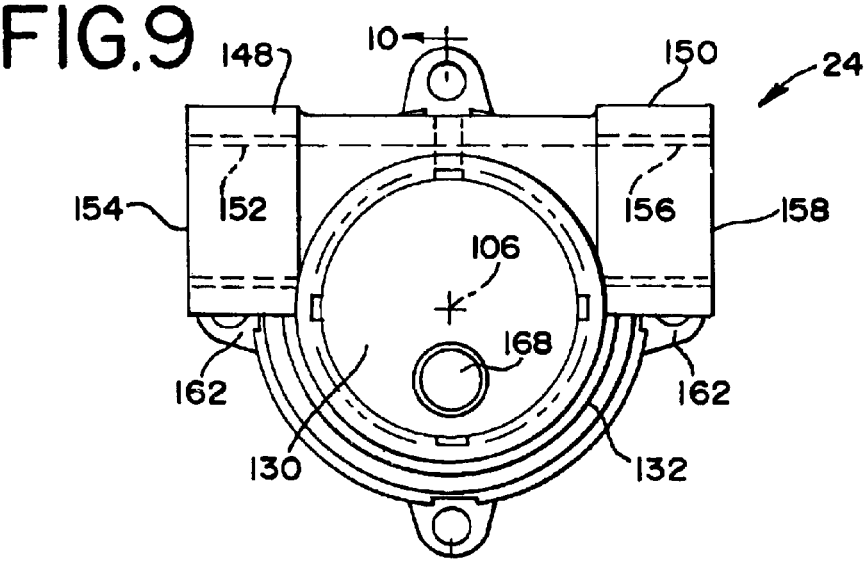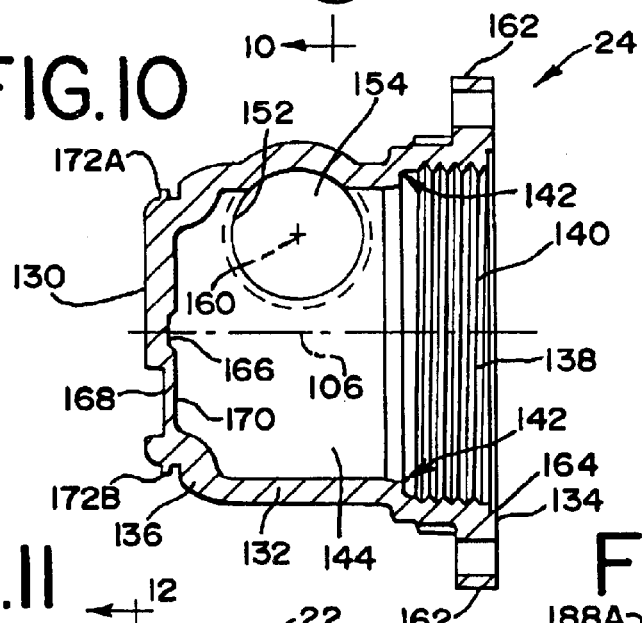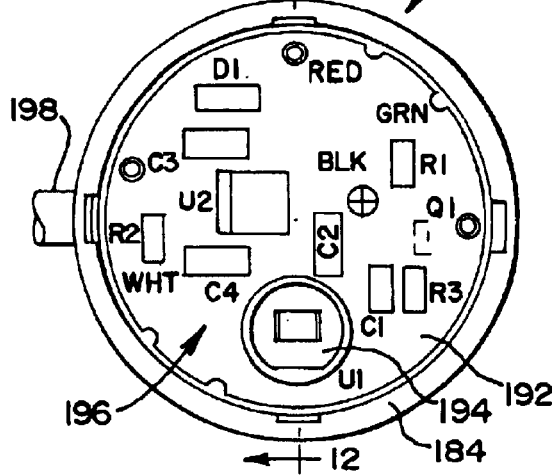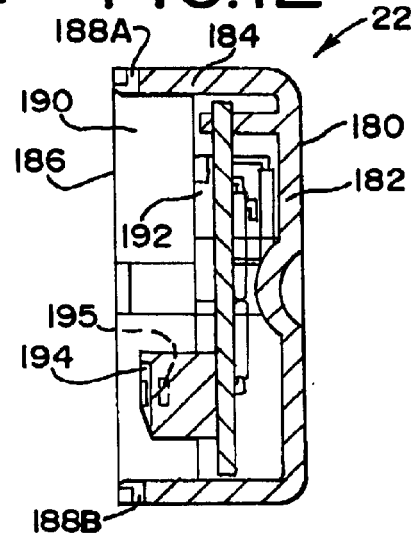

FLUID FLOWMETER HAVING A HALL EFFECT SENSOR WITH AN INTERNAL MAGNET

RELATED APPLICATIONS

This application claims the benefit of U.S. Provisional Application No. 60/347,652, filed Oct. 23, 2001.

BACKGROUND OF THE INVENTION

The present invention is directed to a fluid flowmeter for sensing the flow rate of a fluid, and in particular to a fluid flowmeter having a Hall Effect sensor including an internal magnet adapted to sense movement of a metal pole piece located in an impeller.

Prior fluid flowmeters included multiple magnets that were located in the fluid passageway of the flowmeter and that were passed in front of a Hall Effect sensor to detect the flow rate of the fluid. Use of multiple magnets increases the cost of manufacturing the flowmeter, creates an unnecessarily large magnetic field which potentially interferes with other instrumentation, and makes removal and replacement of the magnet difficult. The present invention locates the magnet outside of the fluid passageway and eliminates the use of multiple magnets thereby lowering the cost of manufacture and providing a reduction in the magnetic field created by the flowmeter.

SUMMARY OF THE INVENTION

A flowmeter for sensing fluid flow. The flowmeter includes a housing having a wall, a first port, a second port, a chamber in fluid communication with the first port and the second port, and a fluid passageway extending from the first port to the second port through the chamber. The flowmeter also includes a non-magnetized impeller located within the chamber of the housing that is rotatable about an axis. The impeller includes a shaft having a cylindrical bore, a base attached to the shaft, and one or more blades attached to the shaft and extending radially outwardly from the shaft. The base of the impeller includes a carrier member. A non-magnetized metal pole piece is enclosed within the carrier member that includes two arms extending radially outwardly from the central axis of the shaft. A cap having a spindle is attached to the housing. The bore of the shaft of the impeller is adapted to receive the spindle such that the impeller is rotatably mounted on the spindle and is rotatable with respect to the spindle. A first end of the spindle is attached to the cap and the second end of the spindle is adapted to be located in a recess formed in the wall of the housing. The flowmeter also includes a Hall Effect sensor having an internal magnet. The Hall Effect sensor and the magnet are located outside of the fluid passageway with the Hall Effect sensor located within an exterior pocket formed in the wall of the housing. The wall of the housing separates the Hall Effect sensor and the magnet from the fluid passageway. Fluid flowing through the fluid passageway rotates the impeller and the pole piece about the axis of the impeller and the magnetic field generated by the magnet enables the Hall Effect sensor to sense the speed of rotation of the impeller and to thereby sense the rate of fluid flow through the fluid passageway.

BRIEF DESCRIPTION OF THE DRAWING FIGURES

FIG. 5 is an end view of the cap of the flowmeter.

FIG. 6 is a cross sectional view taken along line 6—6 of FIG. 5.

FIG. 7 is a side elevational view of the cap.

FIG. 8 is an enlarged partial detail view of the locking mechanism of the cap.

FIG. 9 is a side elevational view of the housing of the flowmeter.

FIG. 10 is a cross sectional view taken along lines 10—10 of FIG. 9.

FIG. 11 is a front elevational view of the sensor assembly.

FIG. 12 is a cross sectional view taken along lines 12—12 of FIG. 11.

DETAILED DESCRIPTION OF THE PREFERRED EMBODIMENT

Figure 1:
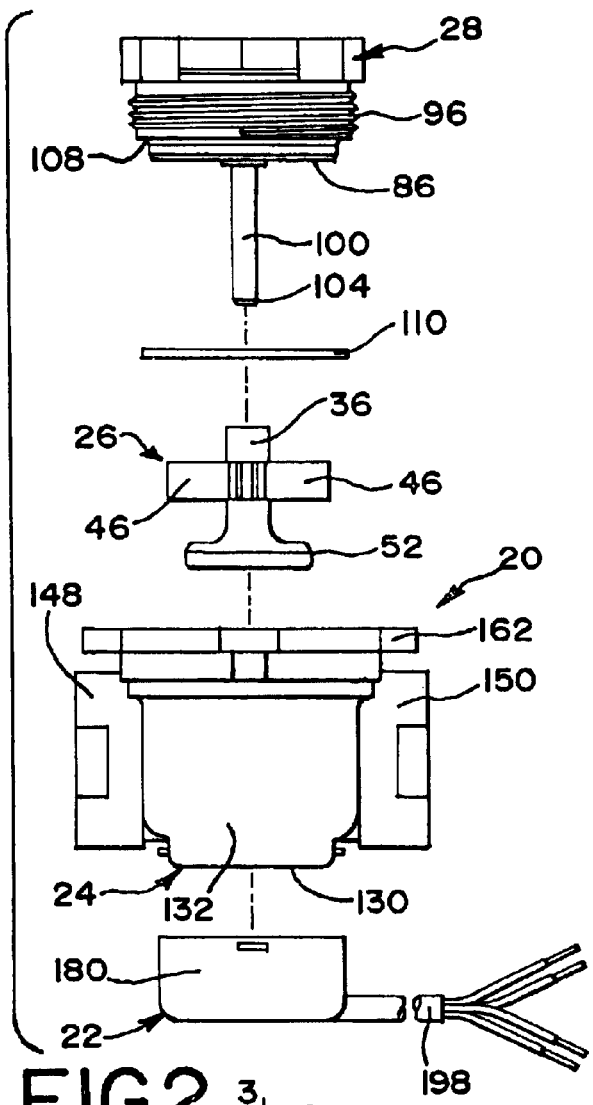
FIG. 1 is an exploded view of the fluid flowmeter of the present invention.

The flowmeter 20 of the present invention is adapted to measure or sense the rate of flow of a fluid, such as a liquid, and to provide an electrical output signal indicative of the measured flow rate. The flowmeter 20 as shown in FIG. 1 includes a sensor assembly 22 which is adapted to be attached to a housing 24. The flowmeter 20 also includes a rotatable impeller 26 adapted to be located within the housing 24 and a cap 28 adapted to be removably attached to the housing 24.

Figure 4:
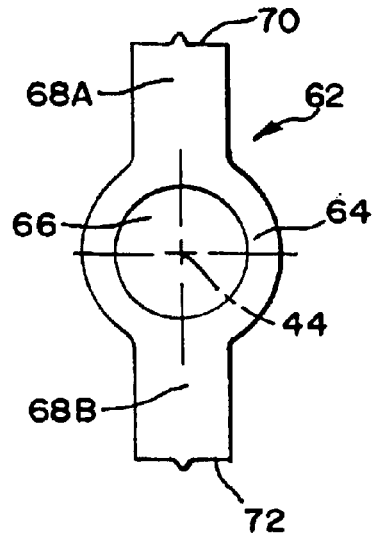
FIG. 4 is a top plan view of the metal pole piece of the impeller.
Figure 2:
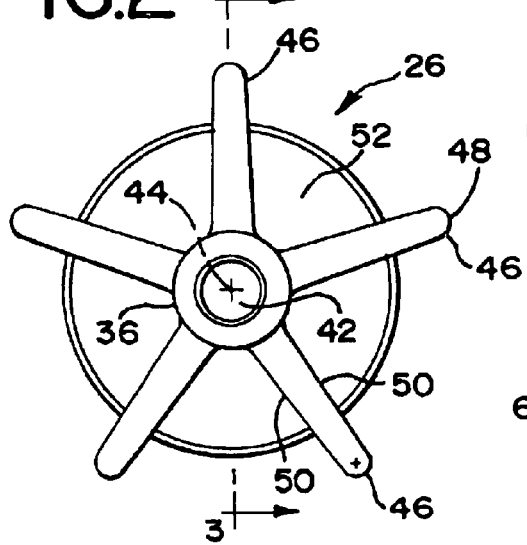
FIG. 2 is an end view of the impeller of the flowmeter.
Figure 3:
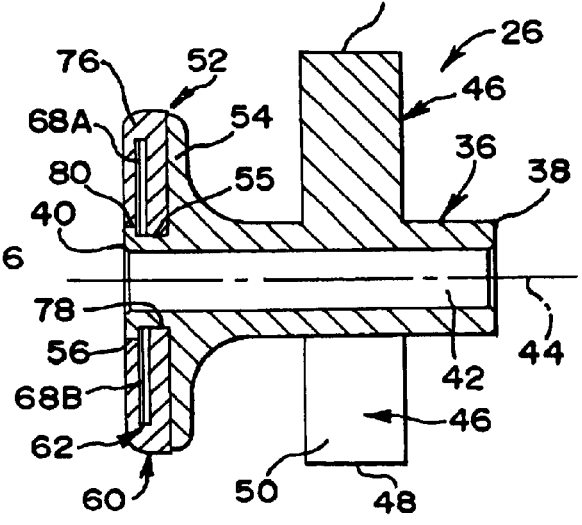
FIG. 3 is a cross sectional view taken along line 3—3 of FIG. 2.

As best shown in FIGS. 2 and 3, the impeller 26 includes an elongate shaft 36 extending from a first end 38 to a second end 40. The shaft 36 includes a generally cylindrical bore 42 that extends from the first end 38 to the second end 40 of the shaft 36 The shaft 36 and bore 42 include a generally linear central axis 44 about which the impeller 26 is adapted to rotate. A plurality of blades 46 are attached to the shaft 36. Each blade 46 is attached at its base to the shaft 36 and extends radially outwardly from the shaft 36 to a tip 48. Each blade 46 includes opposing side surfaces 50 which are generally planar and which extend radially outwardly from the shaft 36 to the tip 48. The impeller 26 also includes a generally circular disk-like base 52 attached to the second end 40 of the shaft 36. The base 52 includes a generally circular flange 54 which extends outwardly from the shaft 36. The second end 40 of the shaft 36 includes an annular groove 55 located between the flange 54 and a circular lip 56 that extends radially outwardly from the shaft 36. The groove 55 and the lip 56 are located concentrically about the axis 44. The base 52 also includes a carrier member 60 having a pole piece 62. The pole piece 62, as best shown in FIG. 4, is generally plate-like and includes a generally circular center portion 64 having an aperture 66. The pole piece 62 also includes a plurality of arms 68A and 68B. The arm 68A extends from the center portion 64 to a first end 70 and the arm 68B extends from the center portion 64 to a second end 72. The arms 68A and B are aligned with one another on opposite sides of the center portion 64. The pole piece 62 is preferably formed from non-magnetized metal. The body 76 of the carrier member 60 is preferably formed from a plastic material such that the pole piece 62 is molded within the body 76 of the carrier member 60. The body 76 of the carrier member 60 includes a central aperture which is aligned with, and which is approximately the same size, as the aperture 66 of the pole piece 62. The body 76 also includes an annular groove 80 adapted to receive the lip 56 of the shaft 36. The body 76 is adapted to be snap fit over the second end 40 of the shaft 36 such that the body 76 of the carrier member 60 is located adjacent to the flange 54, and such that the body 76 is located within the annular groove 55 at the second end 40 of the shaft 36. The lip 56 of the shaft 36 retains the carrier member 60 on the shaft 36 adjacent to the flange 54. The carrier member 60 and pole piece 62 are conjointly rotatable with the shaft 36 and blades 46 of the impeller 26 about the central axis 44. The shaft 36, blades 46 and flange 54 are made from a plastic material.

The cap 28 of the flowmeter 20, as best shown in FIGS. 5–7, includes an end wall 86 having a generally circular perimeter 88. The cap 28 also includes a generally cylindrical sleeve 90 having a first end 92 and a second end 94 attached to the perimeter 88 of the wall 86. The second 94 of the sleeve 90 includes one or more external threads 96. The external surface of the first end 92 of the sleeve 90 is generally polygonal shaped and includes a plurality of generally planar surfaces 98. The cap 28 includes an elongate generally cylindrical spindle 100 having a first end 102 and a second end 104. The first end 102 of the spindle 100 is attached to the wall 86 and extends outwardly generally perpendicular to the wall 86 in a cantilevered manner toward the second end 104. The spindle 100 is concentrically located on the wall 86. The spindle 100 includes a generally linear central axis 106. The cap 28 includes an annular ledge 108 at the second end 94 of the sleeve 90 which is adapted to receive a generally circular gasket 110 which is shown in FIG. 1. The gasket 110 is preferably an O-ring formed from an elastomeric material. The cap 28 also includes a generally annular ledge 112 located adjacent the polygonal surfaces 98 at the second end 94 of the sleeve 90. The ledge 112 includes a locking member 114, as best shown in FIGS. 7 and 8, including an undulating surface 116. The undulating surface 116 includes a plurality of ridges 118 and a plurality of valleys 120, with the ridges 118 and valleys 120 alternating in position with one another. As shown in FIG. 8, the undulating surface 116 has a generally sinusoidal configuration. The wall 86 and sleeve 90 of the cap 28 is preferably made from a clear or translucent plastic material. The spindle 100 is made from metal.

The housing 24, as best shown in FIGS. 9 and 10, includes an end wall 130 and a peripheral side wall 132 having a first end 134 and a second end 136. The second end 136 of the side wall 132 is attached to the end wall 130. The first end 134 of the side wall 132 includes a generally circular opening 138 having one or more internal threads 140. The side wall 130 includes an internal generally annular ledge 142 adapted to receive and engage the gasket 110. The housing 24 includes a hollow chamber 144 formed by the end wall 130 and side wall 132. The housing 24 includes a first connector member 148 attached to the side wall 132 and a second connector member 150 attached to the side wall 132. The connector member 148 includes generally cylindrical threaded bore 152 and a port 154. The connector member 150 includes a generally cylindrical threaded bore 156 and a port 158. The bores 152 and 156 are coaxially aligned with one another and are in fluid communication with the chamber 144 such that a fluid passage is provided between the port 154 of the bore 152 and the port 158 of the bore 156. The bores 152 and 156 have a common generally linear central axis 160. As best shown in FIG. 10, the central axis 160 of the bores 152 and 156 is located above and offset from the central axis 106 of the spindle 100.

The first end 134 of the side wall 132 includes a plurality of mounting lugs 162 each having an aperture adapted to receive a fastener. The second end 136 of the side wall 132 also includes a radially inwardly and longitudinally outwardly extending tab 164 that is adapted to releasably engage the undulating surface 116 of the locking member 114 on the cap 28. The internal surface of the end wall 130 includes a generally centrally located recess 166 adapted to receive the second end 104 of the spindle 100. The outer surface of the end wall 130 includes a pocket 168. The pocket 168 forms a relatively thin wall portion 170 in the end wall 130. The end wall 130 includes a pair of diametrically opposed outwardly extending tabs 172A–B. The housing 24 is preferably made from a clear or translucent plastic material.

The sensor assembly 22, as best shown in FIGS. 11 and 12, includes a cover 180 having a generally circular end wall 182 and a generally cylindrical side wall 184. The side wall 184 includes a peripheral rim 186 having a pair of diametrically opposed apertures 188A–B which are adapted to respectively receive the tabs 172A–B of the housing 24 to thereby attach the sensor assembly 22 to the housing 24. The cover 180 includes a chamber 190. An electrical circuit board 192 is located within the chamber 190 and is attached to the cover 180. A Hall Effect sensor 194 is attached to the circuit board 192. The Hall Effect sensor 194 includes an internal magnet 195 for creating a magnetic field. A preferred Hall Effect sensor 194 is manufactured by Allegro MicroSystems of Worcester, Mass. as Product No. ATF611LSB. The Hall Effect sensor 194 is adapted to be located within the pocket 168 of the end wall 130 of the housing 24 and to be located closely adjacent to the thin wall portion 170. The Hall Effect sensor 194 is in electrical communication with an electrical circuit 196 which is electrically connected to an electrical cable 198 having a plurality of electrical wires.

In operation, the gasket 110 is placed around the wall 86 of the cap 28 adjacent to the ledge 108. The second end 104 of the spindle 100 of the cap 28 is then inserted into the bore 42 of the impeller 26. The first end 38 of the shaft 36 of the impeller 26 is located adjacent to the end wall 86 of the cap 28. The second end 104 of the spindle 100 projects outwardly from the bore 42 beyond the base 52 of the impeller 26.

The impeller 26 is inserted into the chamber 144 of the housing 24 and the threads 96 of the cap 28 are threadably engaged to the threads 140 of the opening 138 in the housing 24. The cap 28 is rotated about the axis 106 with respect to the housing 24 until the gasket 110 is seated between the ledge 142 of the housing 24 and the ledge 108 of the cap 28 to create a fluid-tight seal therebetween. The cap 28 is also rotated with respect to the housing 24 until the undulating surface 166 of the locking member 114 engages the tab 164 of the housing 24. The tab 64 becomes seated within a valley 120 of the locking member 114, between adjacent ridges 118, to prevent unintentional rotation of the cap 28 with respect to the housing 24 which may break the seal created by the gasket 110. The second end 104 of the spindle 100 is located within the recess 166 of the end wall 130 of the housing 24. One or more thin metal washers may be located on the spindle 100 between the base 52 of the impeller 26 and the interior surface of the end wall 130 to slightly space the impeller 26 from the end wall 130. The impeller 26 is freely rotatable with respect to and about the spindle 100 and about the central axes 44 and 106 which are coextensive with one another. The pole piece 62 in the base 52 of the impeller 26 is located closely adjacent to the interior surface of the end wall 130 of the housing 24, and is also located closely adjacent to the Hall Effect sensor 194 located in the pocket 168 when the pole piece 62 is properly oriented with respect to the sensor 194.

The connector member 148 is adapted to be connected to a fluid inlet conduit and the connector member 150 is adapted to be connected to a fluid outlet conduit. As fluid flows through the fluid passageway from the port 154 and bore 152, through the chamber 144, and the bore 156 and port 158 whereupon the fluid leaves the flowmeter 20, the flowing fluid engages the blades 46 of the impeller 26 that are located between the bores 152 and 156 and above the central axis 44 to thereby rotate the impeller 26 about the spindle 100 and axis 44. As the impeller 26 rotates, the pole piece 62 within the base 52 also rotates about the central axis 44. Consequently, as the impeller 26 rotates, the arms 68A and 68B rotate in and out of a position adjacent to the Hall Effect sensor 194 which is located within the pocket 168 of the end wall 130. The Hall Effect sensor 194 thereby senses and measures the rotational speed at which the impeller 26 is rotating, such as in revolutions per minute. The rotational speed at which the impeller 26 rotates corresponds to the flow rate, such as cubic feet per minute, of the fluid which flows though the fluid passageway between the bores 152 and 156 of the flowmeter 20 The Hall Effect sensor 194 sends an electrical signal to the circuit 196. The circuit 196 processes the Hall Effect sensor signal in a manner well known in the art and transmits a flow rate signal to the cable 198 which may be connected to a control device or flow rate display. The single magnet of the Hall Effect sensor 194 is located outside of the chamber 144 of the housing 24 and outside of the fluid passageway of the flowmeter 20.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A flowmeter for sensing fluid flow, said flowmeter comprising:
    a housing including a first port, a second port, a chamber in fluid communication with said first port and said second port, and a fluid passageway extending from said first port to said second port;
    an impeller located within said chamber of said housing, said impeller being rotatable about an axis,
    a magnet located outside of said fluid passageway adapted to provide a magnetic field; and
    a Hall Effect sensor adapted to sense the rotational speed of said impeller, said magnet being located within said Hall Effect sensor;
    whereby fluid flow through said fluid passageway rotates said impeller about said axis and said magnetic field enables the sensing of the rotation of said impeller and thereby the sensing of fluid flow through said fluid passageway.

2. A The flowmeter of claim 1 wherein said housing includes a wall separating said Hall Effect sensor from said chamber.

3. The flowmeter of claim 2 wherein said wall of said housing includes a pocket, said pocket adapted to receive said Hall Effect sensor.

4. The flowmeter of claim 1 wherein said impeller includes a pole piece adapted to conjointly rotate with said impeller.

5. The flowmeter of claim 4 wherein said pole piece is formed from metal.

6. The flowmeter of claim 4 wherein said impeller includes a base, said pole piece being enclosed within said base.

7. The flowmeter of claim 6 wherein said base of said impeller includes a carrier member, said carrier member including said pole piece.

8. The flowmeter of claim 4 wherein said pole piece includes a first arm and a second arm.

9. The flowmeter of claim 1 wherein said impeller includes a shaft and one or more blades extending outwardly from said shaft.

10. The flowmeter of claim 1 wherein said impeller includes a bore adapted to receive a spindle such that said impeller is rotatable with respect to said spindle.

11. The flowmeter of claim 1 including a cap removably attached to said housing, said cap including a spindle extending into said chamber of said housing, said impeller being rotatably mounted on said spindle.

12. The flowmeter of claim 11 wherein said spindle includes a first end attached to said cap and a second end adapted to be located in a recess formed in a wall of said housing.

13. The flowmeter of claim 1 wherein said impeller is not magnetized.

14. A flowmeter for sensing fluid flow, said flowmeter comprising:
    a housing including a first port, a second port, a chamber in fluid communication with said first port and said second port, and a fluid passageway extending from said first port to said second port;
    an impeller located within said chamber of said housing, said impeller including a base and a pole piece enclosed within said base, said impeller being rotatable about an axis, said pole piece adapted to rotate conjointly with said impeller; and
    a magnet located outside of said fluid passageway adapted to provide a magnetic field;
    whereby fluid flow through said fluid passageway rotates said impeller about said axis and said magnetic field enables the sensing of the rotation of said pole piece of said impeller and thereby the sensing of fluid flow through said fluid passageway.

15. A flowmeter for sensing fluid flow, said flowmeter comprising:
    a housing including a first port, a second port, a chamber in fluid communication with said first port and said second port, a fluid passageway extending from said first port to said second port, and a wall having a recess;
    an impeller located within said chamber of said housing, said impeller being rotatable about an axis;
    a cap removably attached to said housing, said cap including a spindle extending into said chamber of said housing, said spindle including a first end and a second end, said second end adapted to be located in said recess in said wall of said housing, said impeller being rotatably mounted on said spindle; and
    a magnet located outside of said fluid passageway adapted to provide a magnetic field;
    whereby fluid flow through said fluid passageway rotates said impeller about said axis and said magnetic field enables the sensing of the rotation of said impeller and thereby the sensing of fluid flow through said fluid passageway.

* * * * *